(12) United States Patent
Medved et al.

(10) Patent No.: US 6,366,723 B1
(45) Date of Patent: Apr. 2, 2002

(54) WIRELESS OPTICAL COMMUNICATIONS WITHOUT ELECTRONICS

(75) Inventors: David Medved; Leonid Davidovich, both of Jerusalem (IL)

(73) Assignee: Jolt Ltd., Jerusalem (IL)

(*) Notice: Subject to any disclaimer, the term of this patent is extended or adjusted under 35 U.S.C. 154(b) by 0 days.

(21) Appl. No.: 09/623,902

(22) PCT Filed: Sep. 14, 1999

(86) PCT No.: PCT/IL99/00500

§ 371 Date: Sep. 11, 2000

§ 102(e) Date: Sep. 11, 2000

(87) PCT Pub. No.: WO00/16489

PCT Pub. Date: Mar. 23, 2000

Related U.S. Application Data

(60) Provisional application No. 60/100,632, filed on Sep. 16, 1998.

(51) Int. Cl.⁷ .................................................. G02B 6/26
(52) U.S. Cl. ........................................................ 385/39
(58) Field of Search ................................ 359/125, 152, 359/172, 118, 144; 385/31, 39, 50, 24

(56) References Cited

U.S. PATENT DOCUMENTS

| 5,067,788 A | | 11/1991 | Jannson et al. | |
|---|---|---|---|---|
| 5,247,380 A | * | 9/1993 | Lee et al. | 359/118 |
| 5,278,687 A | * | 1/1994 | Jannson et al. | 359/125 |
| 5,596,437 A | * | 1/1997 | Heins | 359/144 |
| 5,771,320 A | | 6/1998 | Stone | |
| 5,818,619 A | * | 10/1998 | Medved et al. | 359/172 |
| 5,959,752 A | | 9/1999 | Ota | 359/152 |

* cited by examiner

*Primary Examiner*—Akm E. Ullah
(74) *Attorney, Agent, or Firm*—Mark M. Friedman

(57) ABSTRACT

A system for exchanging optical signals between two separate locations. Each location is provided with a transceiver that includes a transmitter and a receiver. Both the transmitter and the receiver are based on a transceiver unit, used as a transmitter unit in the transmitter and as a receiver unit in the receiver. The transceiver unit includes a multimode optical waveguide and imaging optics that collimates the light emerging from the waveguide in the transmitter implementation of the unit and that focuses incoming light onto the waveguide in the receiver implementation of the unit. The waveguide is terminated by a FC/APC to suppress reflections at the waveguide/air interface. In each transceiver, the units are mounted in clusters, with their optical axes all parallel. Transmitter units of a transmitter cluster are optically coupled via a splitter to a common input waveguide, possibly via one or more optical amplifiers. Receiver units of a receiver cluster are optically coupled via a combiner to a common output waveguide. Alternatively, the receiver includes an airlink receiver to convert incoming optical signals to electronic signals and a converter unit to convert the electronic signals back to optical signals. The common waveguides in turn are optically coupled to network interface units at each location. Transceivers are aimed at each other to exchange optical signals between the two locations.

17 Claims, 6 Drawing Sheets

US 6,366,723 B1

WIRELESS OPTICAL COMMUNICATIONS WITHOUT ELECTRONICS

This application claims the benefit of Ser. No. 60/100,632 filed Sep. 16, 1998.

FIELD AND BACKGROUND OF THE INVENTION

The present invention relates to wireless communications systems in general, and more particularly to optical wireless communications systems.

Medved et al., in U.S. Pat. No. 5,818,619, which is incorporated by reference for all purposes as if fully set forth herein, teach a wireless communications system for linking different parts of an optical communications network. Each part of the network is provided with one or more optical communications network interface units and with universal converter units that are optically coupled to their respective network interface units. Each universal converter unit includes an airlink transmitter, an airlink receiver, a fiber optic receiver and a fiber optic transmitter. The fiber optic receiver receives outgoing optical signals from the network interface unit and transforms these optical signals to electronic signals. These electronic signals are sent to the airlink transmitter, where these electronic signals are transformed back to optical signals and transmitted as such into free space. The airlink receiver receives optical signals that were transmitted into free space by another universal converter unit and transforms these incoming optical signals into electronic signals. These electronic signals are sent to the fiber optic transmitter, which transforms these electronic signals back to optical signals that are sent to the network interface unit via a fiber optic cable. The network interface units and the universal converter units are operated in pairs, with each member of the pair being a portion of a different optical communications network or of a different part of the same optical communications network. The airlink transmitter of each universal converter unit is aimed at the airlink receiver of the other universal converter unit to enable exchange of optical signals between the two optical communications network or between the two parts of the same optical communications network.

The wireless communications system of Medved et al. is intended for use in an optical communications network in which signals are encoded in a single carrier wavelength. Recently, optical communications networks based on dense wavelength division multiplexing (DWDM) have been introduced. In a DWDM network, several carrier wavelengths are multiplexed on the same optical fiber. The data transmission rate available using DWDM would overwhelm the electronics of the universal converter units of Medved et al. In any case, the various carrier wavelengths would have to be demultiplexed, and a separate network interface unit and universal converter unit would he needed for each carrier wavelength.

There is thus a widely recognized need for, and it would be highly advantageous to have, a system for linking two parts of an optical communications network that are remote from each other in a way that facilitates the exchange of DWDM optical signals.

SUMMARY OF THE INVENTION

According to the present invention there is provided an optical device including: (a) a multimode optical waveguide having a proximal end and a distal end; (b) a single mode optical waveguide having a distal end; (c) a mechanism for optically coupling the distal end of the single mode optical waveguide to the proximal end of the multimode optical waveguide; and (d) imaging optics, optically coupled to the distal end of the multimode optical waveguide.

According to the present invention there is provided an optical transmitter, including: (a) a common input optical waveguide; (b) a plurality of transmitter optical waveguides, each transmitter optical waveguide having a distal end; (c) for each transmitter optical waveguide, imaging optics, optically coupled to the distal end of the each transmitter optical waveguide; and (d) a mechanism for optically coupling the common input optical waveguide to the transmitter optical waveguides.

According to the present invention there is provided an optical receiver, including: (a) a common output optical waveguide; (b) a plurality of receiver optical waveguides, each receiver optical waveguide having a distal end; (c) for each receiver optical waveguide, imaging optics, optically coupled to the distal end of the each receiver optical waveguide; and (d) a mechanism for optically coupling the common output optical waveguide to the receiver optical waveguides.

According to the present invention there is provided an optical transceiver including: (a) a transmitter optical waveguide having a distal end; (b) transmitter imaging optics, having a transmitter optical axis, optically coupled to the distal end of the transmitter optical waveguide; (c) a plurality of receiver optical waveguides, each receiver optical waveguide having a distal end; and (d) for each receiver optical waveguide, receiver imaging optics, having a receiver optical axis, optically coupled to the distal end of the each receiver optical waveguide, the transmitter optical axis and the receiver optical axes all being substantially parallel.

According to the present invention there is provided a wireless communications system, including: (a) a transmitter optical waveguide having a proximal end and a distal end; (b) transmitter imaging optics, optically coupled to the distal end of the transmitter optical waveguide; (c) at least one receiver optical waveguide having a proximal end and a distal end; (d) for each at least one receiver optical waveguide, receiver imaging optics optically coupled to the distal end of the at least one receiver optical waveguide; and (e) an optical communication network interface unit, optically coupled to the proximal ends of the transmitter optical waveguide and of the at least one receiver optical waveguide, for transmitting optical signals to the transmitter optical waveguide and for receiving optical signals from the at least one receiver optical waveguide.

According to the present invention there is provided an optical transceiver including: (a) a transmitter optical waveguide having a distal end; (b) transmitter imaging optics, having a transmitter optical axis, optically coupled to the distal end of the transmitter optical waveguide; and (c) an airlink receiver having a receiver optical axis substantially parallel to the transmitter optical axis.

According to the present invention there is provided a wireless communication system including: (a) a transmitter optical waveguide having a proximal end and a distal end; (b) transmitter imaging optics, optically coupled to the distal end of the transmitter optical waveguide; (c) an airlink receiver; (d) a converter unit, electrically coupled to the airlink receiver; and (e) an optical communication network interface unit, optically coupled to the proximal end of the transmitter optical waveguide and to the converter unit, for transmitting optical signals to the transmitter optical waveguide and for receiving optical signals from the converter unit.

According to the present invention there is provided an optical device including: (a) an optical fiber having a distal end; and (b) a FC/APC fiber optic connector serving as a reflection-suppressing interface between the distal end and a rarefied optical medium.

According to the present invention there is provided a wireless system for transmitting wavelength-multiplexed optical signals from a first location to a second location, including: (a) an optical-transmitter, at the first location, the optical transmitter including a multimode input optical waveguide for receiving the optical signals; and (b) an optical receiver, at the second location, for receiving the optical signals from the optical transmitter.

According to the present invention there is provided a method for exchanging optical signals between two parts of an optical network, including the steps of: (a) providing each part of the network with: (i) a network interface unit, and (ii) a transceiver including: (A) transmitter imaging optics, (B) at least one transmitter optical waveguide for optically coupling the network interface unit to the transmitter imaging optics, (C) receiver imaging optics, and (D) at least one receiver optical waveguide for optically coupling the network interface unit to the receiver imaging optics; and (b) aiming the transceivers so that at least part of the optical signals emerging from the transmitter imaging optics of a first the transceiver are intercepted by the receiver imaging optics of a second the transceiver and so that at least part of the optical signals emerging from the transmitter imaging optics of the second transceiver are intercepted by the receiver imaging optics of the first transceiver.

According to the present invention there is provided a method for exchanging optical signals between two parts of an optical network, including the steps of: (a) providing each part of the network with: (i) a network interface unit, and (ii) a transceiver including: (A) transmitter imaging optics, (B) at least one transmitter optical waveguide for optically coupling the network interface unit to the transmitter imaging optics, (C) an airlink receiver, and (D) a converter unit, electrically coupled to the airlink receiver and optically coupled to the network interface unit; and (b) aiming the transceivers so that at least part of the optical signals emerging from the transmitter imaging optics of a first the transceiver are intercepted by the airlink receiver of a second the transceiver and so that at least part of the optical signals emerging from the transmitter imaging optics of the second transceiver are intercepted by the airlink receiver of the first transceiver.

The basic idea of the present invention is to eliminate the conversion of optical signals in the universal converter unit to electronic signals and then back to optical signals. Instead, the outgoing optical signals, from one network interface unit in one part of the optical communications network, are launched directly into free space and are received directly by another network interface unit in another part of the optical communications network.

To facilitate the direct exchange of optical signals between the network interface units, each network interface unit is provided with an optical transceiver, based on a transceiver unit that is used either as a transmitter unit or a receiver unit. A basic transceiver unit has an optical fiber terminating at one end of a cylindrical housing and imaging optics at the other end of the housing. The optical fiber is provided with a mechanism, such as a FC/APC, for suppressing reflections at the fiber-air interface. When the transceiver unit is used as a transmitter unit, optical signals launched from the end of the optical fiber are collimated by the imaging optics into a collimated beam. When the transceiver unit is used as a receiver unit, the imaging optics focus optical signals that they intercept onto the end of the optical fiber. Preferably, the optical fiber is a multimode optical fiber so that the beam launched from the optical fiber in transmitter mode has an adequately large divergence angle.

The transmitter units and the receiver units are used in clusters, to overcome scintillation. In a compound transmitter that includes several transmitter units, the optical fibers of the transmitter units are connected to a common input optical fiber by a splitter. In a compound receiver that includes several receiver units, the optical fibers of the receiver units are connected to a common output optical fiber by a combiner. For transmission over distances greater than several hundred meters, it is necessary to amplify the optical signals input to the transmitter, using an optical amplifier such as an erbium-doped fiber amplifier or a semiconductor fiber amplifier. In a compound transmitter, one optical amplifier may be provided for the common input optical fiber, or each transmitter unit may be provided with its own optical amplifier. In the latter case, because the input and output of an optical amplifier is via a single mode optical fiber, a mechanism such as a FC/APC is provided for coupling the single mode output of each optical amplifier to the multimode optical fiber of the respective transmitter unit.

To facilitate aiming, the transmitter and receiver units of a transceiver are aligned mutually so that all their optical axes are parallel.

The common output optical fiber of a compound receiver preferably is a multimode fiber. In case the network interface unit is designed to receive single mode optical input, the common output optical fiber is provided with a passive adapter, such as a graded index lens or a collimator, for coupling the common output optical fiber to the network interface unit. Similarly, the multimode optical fiber of a single-unit receiver is provided in such a case with a similar passive adapter.

As an alternative to all-optical reception, a transceiver of the present invention may include an airlink receiver and a fiber optic transmitter, as in the prior art universal converter unit. The transmitter of the transceiver remains all-optical.

In the application of the present invention to the exchange of DWDM signals, each network interface unit preferably includes a demultiplexer for demultiplexing the DWDM signals.

Although the examples of the present invention described herein are based on optical fibers, it is to be understood that the scope of the present invention includes optical waveguides generally. The wavelengths of the optical signals that fall within the scope of the present invention include infrared, viable, and ultraviolet wavelengths, although the preferred wavelengths are those that are commonly used for optical communication: wavelengths in the neighborhood of 850 nm, wavelengths in the neighborhood of 1330 nm and wavelengths in the neighborhood of 1550 nm.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an optical communications system which can be use to link two widely separated parts of an optical communications network. Specifically, the present invention can be used to exchange DWDM signals between is the two parts of the network.

The principles and operation of optical communications according to the present invention may be better understood with reference to the drawings and the accompanying description.

Figure 1:
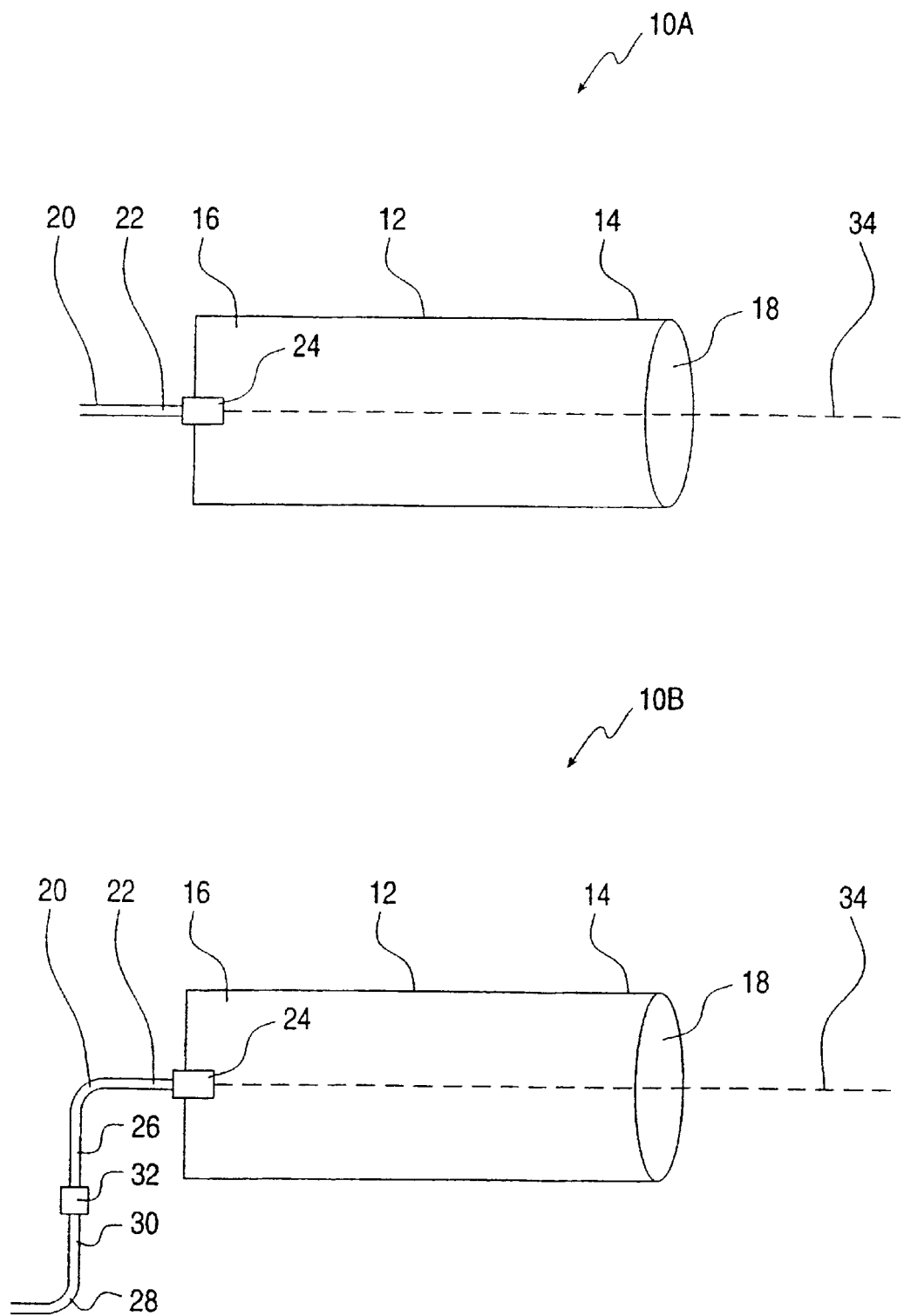
FIG. 1 shows two schematic axial cross sections of two variants of a transceiver unit of the present invention.

Referring now to the drawings, FIG. 1 illustrates two variants, 10A and 10B, of a basic transceiver unit 10 of the present invention. Variants 10A and 10B are illustrated schematically, in axial cross section. Both variants are based on a substantially cylindrical housing 12, at the distal end 14 of which are imaging optics, represented as a lens 18, and at the proximal end 16 of which is a multimode optical fiber 20 whose distal end 22 is terminated in a FC/APC 24. Variant 10B includes, in addition, a single mode optical fiber 28, optically coupled at the distal end 30 thereof to the proximal end 26 of multimode fiber 20 by a FC/APC 32.

Imaging optics 18 define an optical axis 34. When unit 10 is used as a transmitter, optical signals emerge from distal end 22 of optical fiber 20 as a divergent beam of light that is collimated by imaging optics 18 to propagate as a collimated beam of light in the direction defined by optical axis 34. When unit 10 is used as a receiver, unit 10 is aimed so that imaging optics 18 intercept a portion of an incoming beam of light that carries optical signals. Imaging optics 18 focuses the incoming light onto distal end 22 of optical fiber 20. The focal length of imaging optics 18 is adapted to the divergence angle of optical fiber 20.

Typically, optical fibers 20 and 28 are made of optically pure glass. Single mode optical fiber 28 typically has a core diameter of 9 microns. Multimode optical fiber 20 typically has a core diameter of 50, 62.5 and 100 microns, most preferably 100 microns. The purpose of FC/APC 24 is to suppress reflections at the air-glass interface at distal end 22 of optical fiber 20. This use of an FC/APC to suppress reflections at an interface between a solid optical fiber and a rarefied optical medium such as air constitutes an independent aspect of the present invention. The purpose of FC/APC 32 is to connect, and to optically couple, optical fibers 20 and 28. An FC/APC is particularly convenient for this purpose because both optical fibers 20 and 28 typically have the same cladding diameter, 125 microns.

Figure 2:
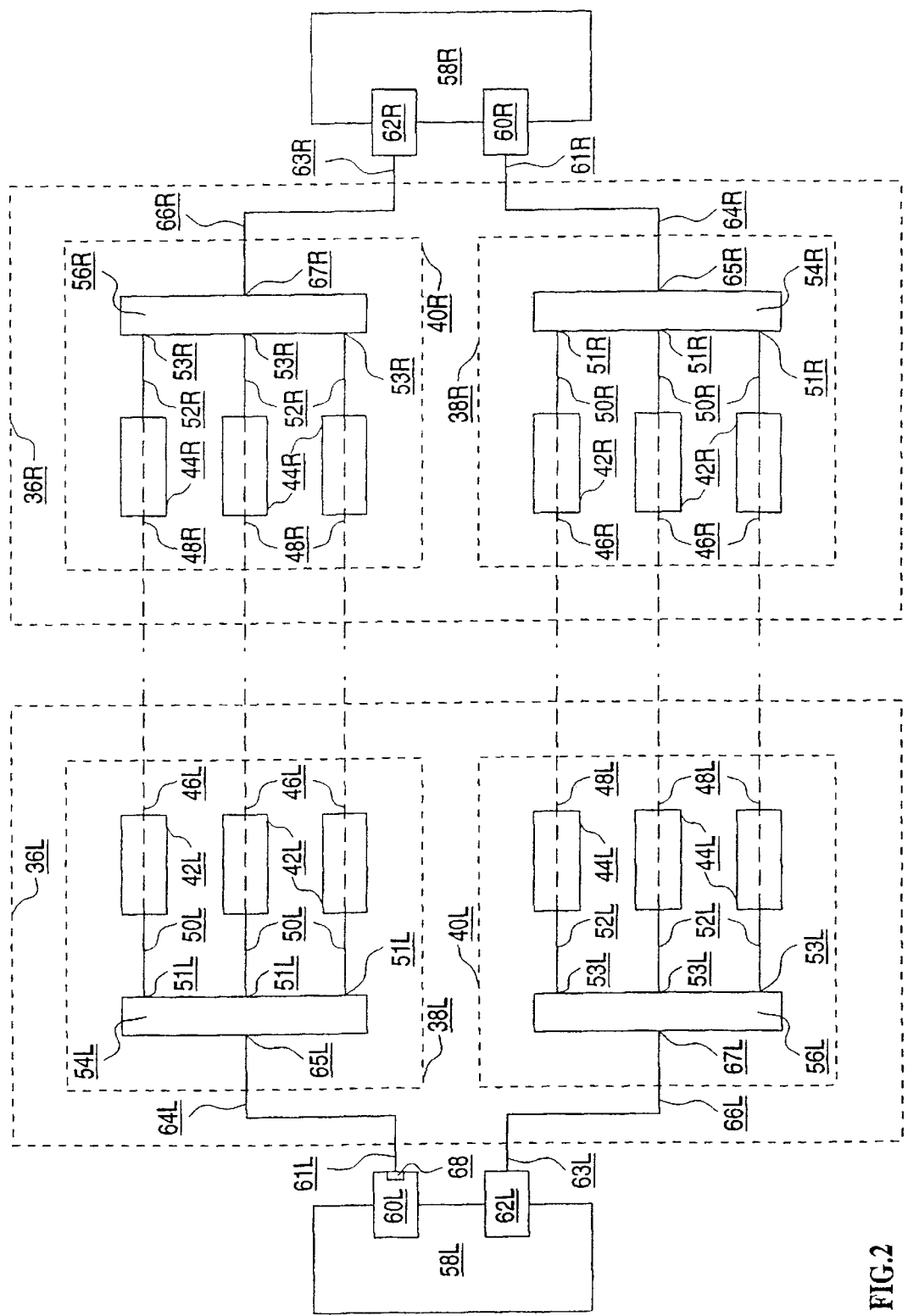
FIG. 2 is a schematic depiction of a system of the present invention.

FIG. 2 is an illustrative schematic depiction of a system of the present invention, for linking two parts of an optical communications network, represented by two network interface units 58L and 58R. Each part of the optical communications network is provided with a transceiver 36 that includes a transmitter 38 and a receiver 40. Transmitter 38 includes a cluster of three transceiver units 10 configured as transmitter units 42. Each transmitter unit 42 includes a transmitter optical fiber 50 and a transmitter optical axis 46.

Receiver unit 40 includes a cluster of three transceiver units 10 configured as receiver units 44. Each receiver unit 44 includes a receiver optical fiber 52 and a receiver optical axis 48. In variant A of transmitter unit 42, transmitter optical fiber 50 is multimode optical fiber 20. In variant B of transmitter unit 42, transmitter optical fiber 50 is the combination of multimode optical fiber 20 and single mode optical fiber 28, coupled by FC/APC 32. Similarly, in variant A of receiver unit 44, receiver optical fiber 52 is multimode optical fiber 20, and in variant B of receiver unit 44, receiver optical fiber 52 is the combination of multimode optical fiber 20 and single mode optical fiber 28, coupled by FC/APC 32. As noted below, it is preferred that receiver units 44 be variants A of transceiver units 10. Transmitter optical fibers 50 are optically coupled, at proximal ends 51 thereof, to the distal end 65 of a common input optical fiber 64, by a splitter 54. Receiver optical fibers 52 are optically coupled, at proximal ends 53 thereof, to the distal end 67 of a common output optical fiber 66. Common input optical fiber 64 is optically coupled, at the proximal end 61 thereof, to a fiber optic transmitter 60 of network interface unit 58. Common output optical fiber 66 is optically coupled, at the proximal end 63 thereof, to a fiber optic receiver 62 of network interface unit 58.

Transmitter units 42L and receiver units 44L are mounted so that optical axes 46L and 48L all are parallel. Similarly, transmitter units 42R and receiver units 44R are mounted so that optical axes 46R and 48R all are parallel. In use, transceiver 36L is aimed at transceiver 36R, so that the collimated beams of light emitted by transmitter units 42L are at least partly intercepted by receiver units 44R and so that the collimated beams of light emitted by transmitter units 42R are at least partly intercepted by receiver units 44L. Optical signals transmitted by network interface unit 58L via transmitter 60L are conveyed, via optical fibers 64L and 50L and splitter 54L, to transmitter units 42L, where these optical signals are launched into free space, as collimated beams of light, towards transceiver 36R. At transceiver 36R, the optical signals received by receiver units 44R are conveyed, via optical fibers 52R and 66R and combiner 56R, to receiver 62R of network interface unit 58R. Meanwhile, optical signals transmitted by network interface unit 58R via transmitter 60R are conveyed, via optical fibers 64R and 50R and splitter 54R, to transmitter units 42R, where these optical signals are launched into free space, as collimated beams of light, towards transceiver 36L. At transceiver 36L, the optical signals received by receiver units 44L are conveyed, via optical fibers 52L and 66L and combiner 56L, to receiver 62L of network interface unit 58L.

Figure 3A:
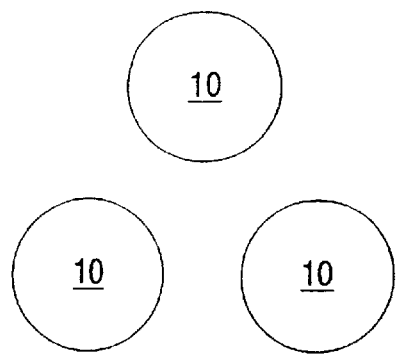
FIG. 3 shows three different transceiver unit cluster configurations.
Figure 3B:
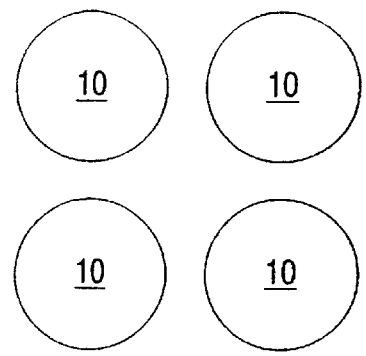
Figure 3C:
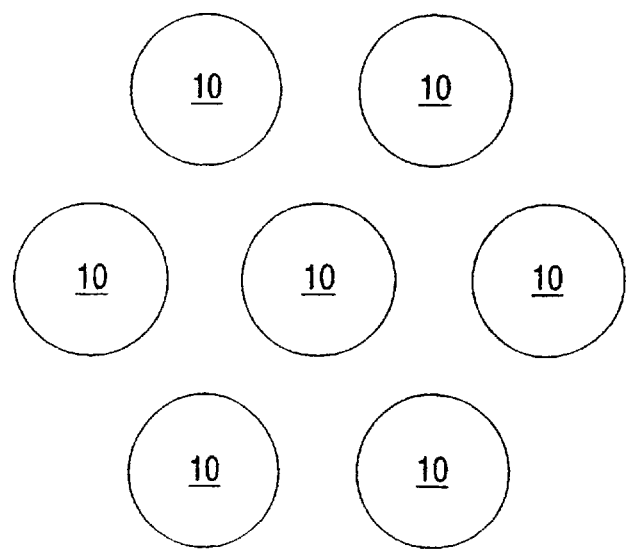

Clusters of transmitter units 42 are used in transmitter 38, and clusters of receiver units 44 are used in receiver 40, to overcome scintillation. FIG. 3 shows transverse views of three different configurations of transceiver units 10 in clusters. FIG. 3A shows three transceiver units 10 in a triangular configuration. FIG. 3B shows four transceiver units 10 in a square configuration. FIG. 3C shows seven transceiver units 10 in a hexagonal configuration.

Kostal et al., in U.S. Pat. No. 4,960,315, teaches a similar system, for temporarily bridging a break in an optical fiber network. Because Kostal et al. base their system on single transmitter and receiver units and on single mode optical fibers, they require an elaborate feedback mechanism to keep their transceivers aimed at each other. This feedback mechanism is not needed in the present invention, because the use of clusters of transmitter units and receiver units compensates for scintillation and beam wander, and because multimode optical fibers 20 of the present invention have wider divergence angles (order of 2 milliradians) than the very narrow divergence angles of the single mode optical fibers used by Kostal et al.

Figure 4:
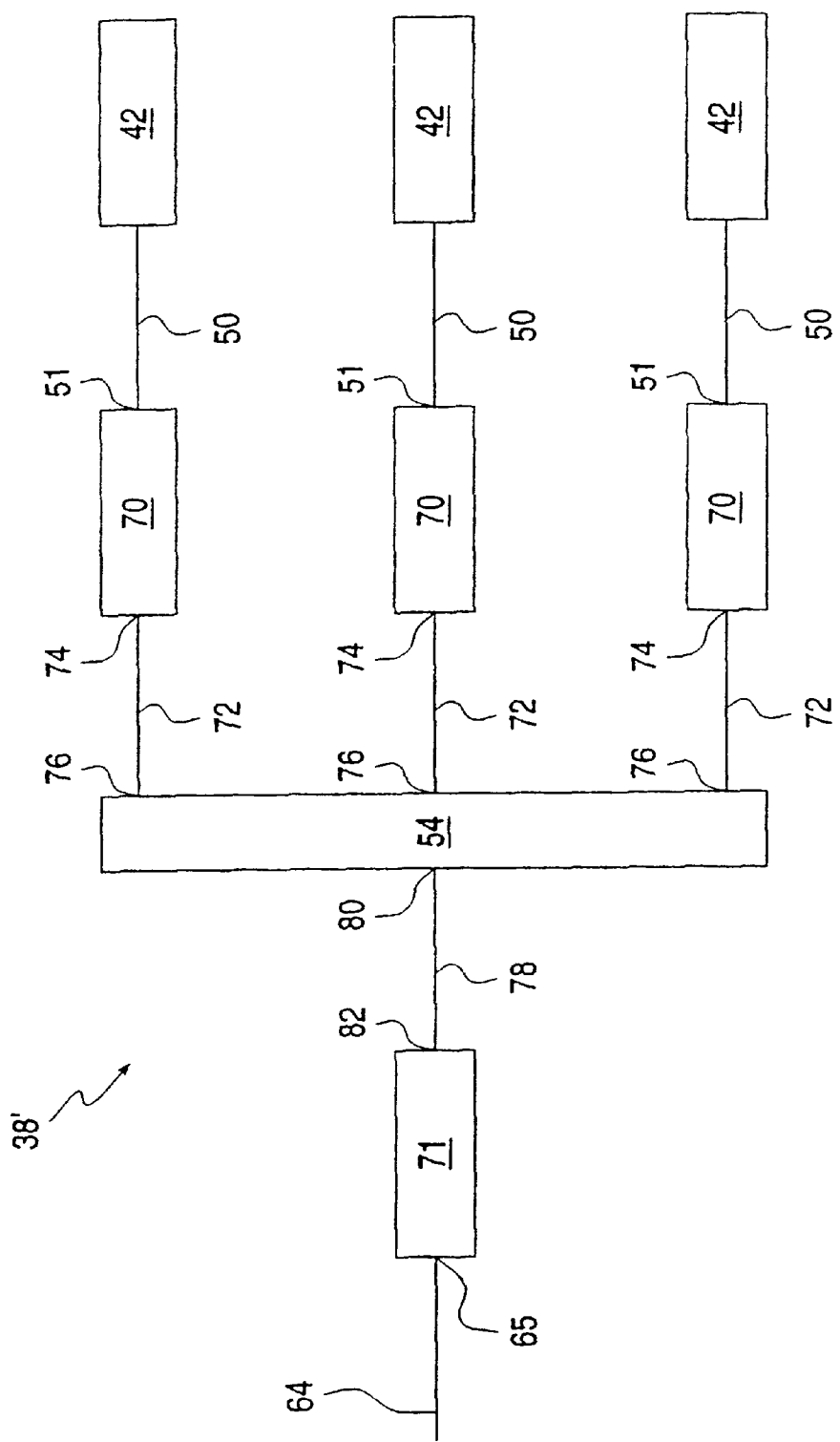
FIG. 4 shows a variant of a transmitter cluster that includes optical amplifiers.

The system of FIG. 2 is adequate for linking two parts of an optical communications network that are separated by distances up to several hundred meters. For communications across greater distances, the transmitted optical signals must be amplified. FIG. 4 shows a variant 38' of transmitter 38 that includes optical amplifiers 70 and 71 for this purpose. In variant 38', each transmitter unit 42 is provided with its own optical amplifier 70. Each optical amplifier 70 is optically coupled to a respective transmitter optical fiber 50 at proximal end 51 of transmitter optical fiber 50 and to a respective optical amplifier input optical fiber 72 at the distal end 74 of optical amplifier input optical fiber 72. Optical amplifier input optical fibers 72 are optically coupled at the proximal ends 76 thereof to distal end 65 of common input optical fiber 64 by splitter 54 and a fourth, common optical amplifier 71. Common optical amplifier 71 is optically coupled to common input optical fiber 64 at distal end 65 thereof and to an optical amplifier output fiber 78 at the proximal end 82 thereof, and the distal end 80 of optical amplifier output fiber 78 is optically coupled to splitter 54. Note that optical amplifier 71 is optional. The optical fibers leading into and out of an optical amplifier 70 must be single mode optical fibers. Therefore, transmitter units 42 must be variants B of transceiver units 10.

Optical amplifiers 70 typically are erbium-doped fiber amplifiers or semiconductor optical amplifiers.

Although the transfer of optical signals from a single-mode optical fiber to a multimode optical fiber is energetically efficient, this is not the case for transfer of optical signals from a multimode optical fiber to a single mode optical fiber. Therefore, it is preferred that receiver units 44 be variants A of transceiver units 10, and that optical fibers 52 and 66 be multimode optical fibers. If receiver 62 of a network interface unit 58 is configured to receive single mode input, receiver 62 must be provided with a passive adapter 68, as shown in FIG. 2 for network interface unit 58L, to provide efficient optical coupling of common output optical fiber 66 to receiver 62. Examples of suitable passive adapters 68 include graded index lenses and collimators.

Figure 5:
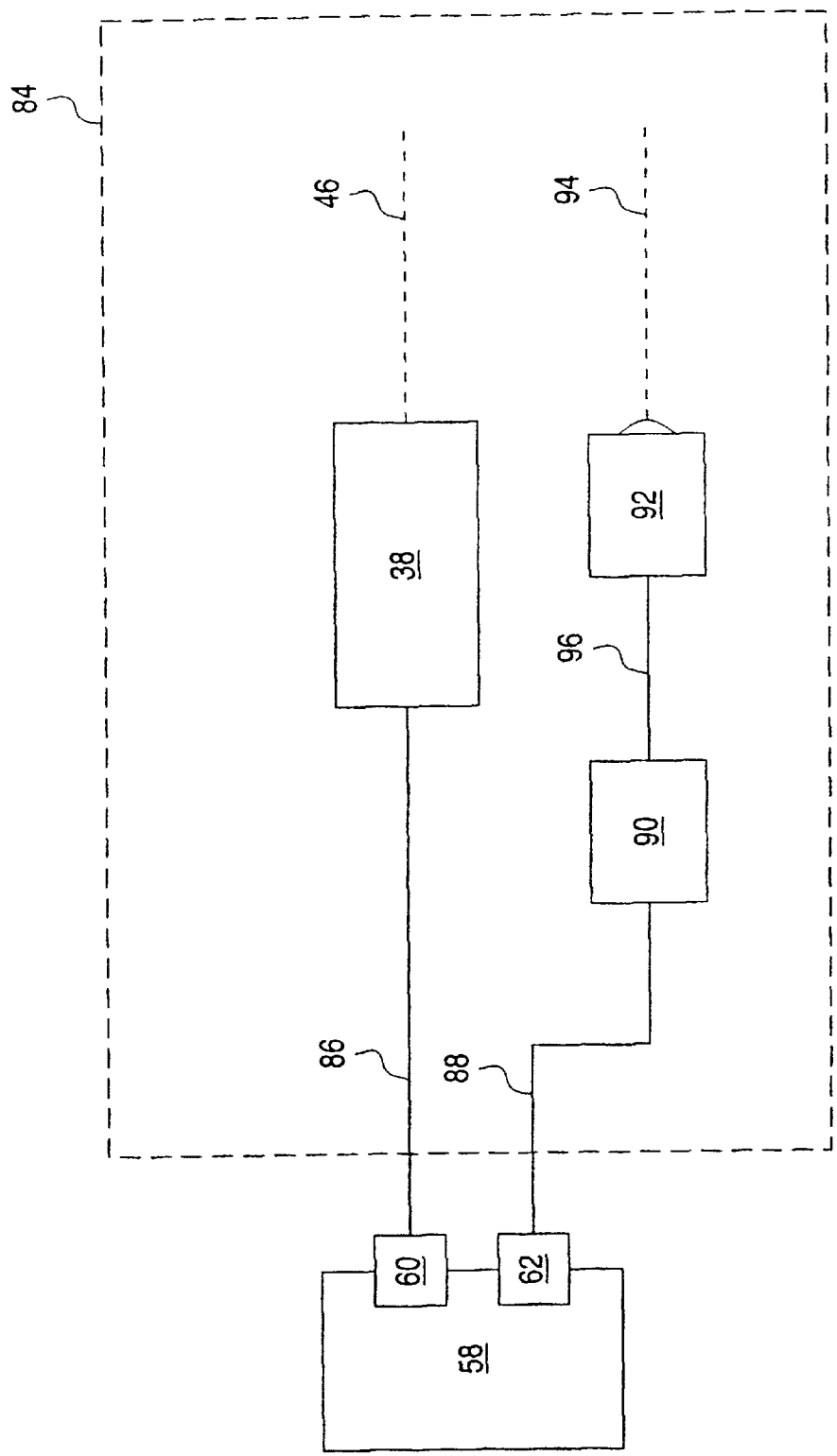
FIG. 5 is a schematic depiction of an alternate transceiver of the present invention.

FIG. 5 shows an alternate transceiver 84 of the present invention, optically coupled to network interface unit 58. Transmitter 60 of network interface unit 58 is optically coupled by a transmitter optical fiber 86 to a transmitter 38 of the type discussed above. Receiver 62 of network interface unit 58 is optically coupled by a receiver optical fiber 88 to a converter unit 90 that is substantially identical to TXU 20 of U.S. Pat. No. 5,818,619. Converter unit 90 is in turn electronically coupled to an airlink receiver 92 by a suitable connector 96. Optical signals intercepted by airlink receiver 92 are converted to electronic signals and relayed to converter unit 96, which converts the electronic signals back to optical signals, as described in U.S. Pat. No. 5,818,619.

In FIG. 5, dashed line 46 represents the optical axis of a single transmitter unit 42, if transmitter 38 includes only one transmitter unit 42, or the parallel optical axes of all the transmitter units 42 of transmitter 38, if transmitter 38 includes more than one transmitter unit 42. Airlink receiver 92 also has an optical axis, indicated by reference numeral 94. Optical axes 46 and 94 are parallel.

Transceiver 84 is used in the same way as transceiver 36 to link two different parts of an optical communications network.

Figure 6:
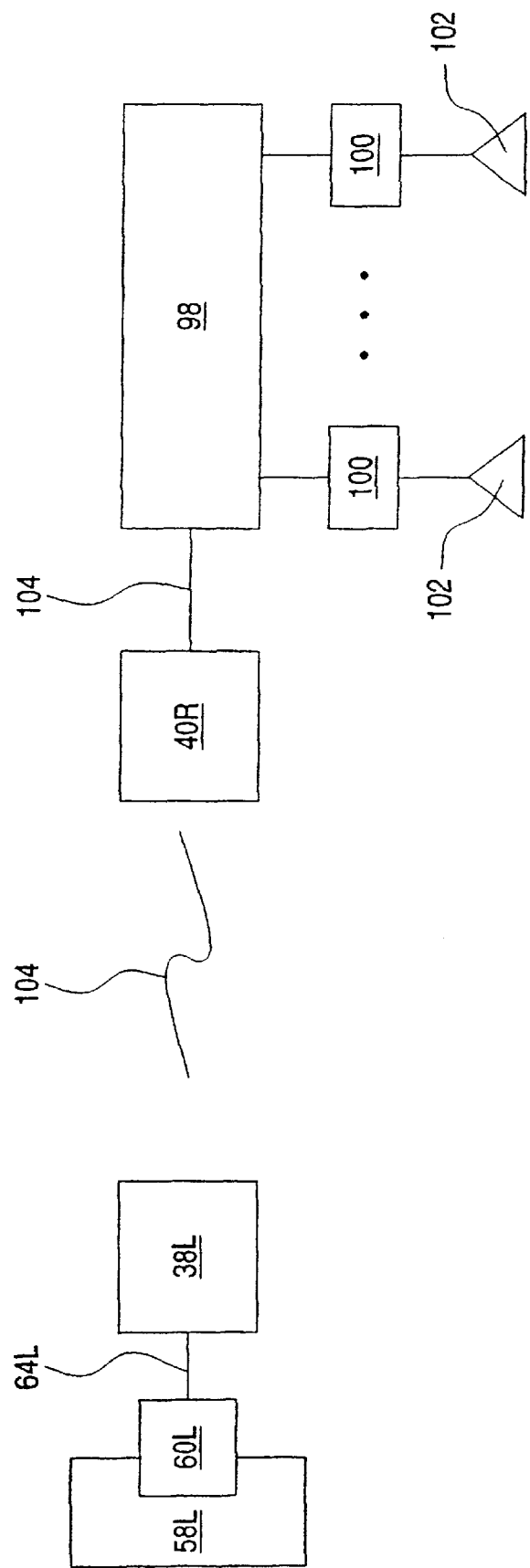
FIG. 6 is a partial schematic depiction of a system of the present invention for exchanging DWDM optical signals.

The systems of the present invention may be substituted for the system described in U.S. Pat. No. 5,818,619 in any of the applications of the latter system. The systems of the present invention also may be used to exchange DWDM signals between two widely separated parts of an optical communications network. FIG. 6 is a partial schematic illustration of a system of the present invention configured for this purpose. At the transmitting location, transmitter 38L receives DWDM optical signals from transmitter 60L of network interface unit 58L via an optical fiber 64L and launches those signals as a collimated light beam 104 towards receiver 40R at the receiving location. Preferably, transmitter 38L is one of the variants of a transmitter of the present invention that includes one or more optical amplifiers 70, as discussed above, and optical fiber 64L is a single mode optical fiber. Receiver 40R is optically coupled to a demultiplexer 98 by a multimode optical waveguide 104. Demultiplexer 98 directs each of the incoming carrier wavelengths to a respective channel that includes a detector 100 for converting the optical signals carried on that carrier wavelength to electronic signals and an amplifier 102 for amplifying the electronic signals from the respective detector 100.

The definition of a network interface unit 58, as understood in the context of the present invention, is broader than in U.S. Pat. No. 5,818,619. In particular, network interface unit 58 may be an RF-optical transceiver, such as the SAT-LIGHT 2000 transceiver available from Foxcom Ltd. of Jerusalem, Israel, that is used for converting RF analog signals to optical signals and vice versa. Conventionally, these optical signals are exchanged between two separate locations via optical fibers. The present invention enables these transceivers to be used to exchange optical signals between two separate locations without laying optical fibers between the two locations. One important application of this is in cellular telephony. It often is desirable to locate a cellular telephony base station antenna at a considerable distance from the other base station hardware. The present invention allows this to be done without laying optical fibers between the base station and the base station antenna, thereby allowing enhanced flexibility in the siting of the base station antenna.

As is well known to those skilled in the art, the preferred optical amplifiers 70 and 71 for a transmitter 38' intended for the transmission of RF analog signals are not the preferred optical amplifiers 70 and 71 that are used for digital applications such as DWDM. The optical amplifiers 70 and 71 that are used in analog applications must have enhanced linearity. Erbium-doped fiber amplifiers of suitable linearity are commonly used in CATV applications.

While the invention has been described with respect to a limited number of embodiments, it will be appreciated that many variations, modifications and other applications of the invention may be made.

What is claimed is:

1. A wireless free space communications system, comprising:
    (a) a transmitter optical waveguide having a proximal end and a distal end;
    (b) transmitter imaging optics, optically coupled to said distal end of said transmitter optical waveguide, for transmitting optical signals into free space;
    (c) at least one receiver optical waveguide having a proximal end and a distal end;
    (d) for each said at least one receiver optical waveguide, receiver imaging optics optically coupled to said distal end of said at least one receiver optical waveguide, for receiving optical signals from free space; and (e) an optical communication network interface unit, optically coupled to said proximal ends of said transmitter optical waveguide and of said at least one receiver optical waveguide, for transmitting said transmitted optical signals to said transmitter optical waveguide and for receiving said received optical signals from said at least one receiver optical waveguide.

2. The wireless communications system of claim 1, including a plurality of said receiver optical waveguides.

3. The wireless communications system of claim 2, further comprising:

(f) a combiner for optically coupling said proximal ends of said receiver optical waveguides to said network interface unit.

4. The wireless communications system of claim 3, further comprising:

(g) a passive adapter for optically coupling said combiner to said network interface unit.

5. The wireless communications system of claim 4, wherein said passive adapter is selected from the group consisting of graded index lenses and collimators.

6. The wireless communications system of claim 1, further comprising:

(f) for each said at least one receiver optical waveguide, a passive adapter for optically coupling said proximal end of said each receiver optical waveguide to said network interface unit.

7. The wireless communications system of claim 4, wherein said passive adapter is selected from the group consisting of graded index lenses and collimators.

8. An optical transceiver comprising:

(a) a transmitter optical waveguide having a distal end;

(b) transmitter imaging optics, having a transmitter optical axis, optically coupled to said distal end of said transmitter optical waveguide; and (c) an airlink receiver having a receiver optical axis substantially parallel to said transmitter optical axis.

9. The optical transceiver of claim 8, further comprising:

(d) a converter unit, electrically coupled to said airlink receiver.

10. A wireless communication system, comprising:

(a) a transmitter optical waveguide having a proximal end and a distal end;

(b) transmitter imaging optics, optically coupled to said distal end of said transmitter optical waveguide;

(c) an airlink receiver;

(d) a converter unit, electrically coupled to said airlink receiver; and (e) an optical communication network interface unit, optically coupled to said proximal end of said transmitter optical waveguide and to said converter unit, for transmitting optical signals to said transmitter optical waveguide and for receiving optical signals from said converter unit.

11. The wireless communications system of claim 1, further comprising:

(f) a mechanism for suppressing reflections at said distal end of said transmitter optical waveguide.

12. The wireless communications system of claim 1, further comprising:

(f) an optical amplifier, optically coupled to said transmitter optical waveguide.

13. A wireless free space communications system comprising:

(a) a transmitter optical waveguide having a proximal end and a distal end;

(b) transmitter imaging optics, optically coupled to said distal end of said transmitter optical waveguide, for transmitting optical signals into free space;

(c) at least one receiver optical waveguide having a proximal end and a distal end; and (d) for each said at least one receiver optical waveguide, receiver imaging optics optically coupled to said distal end of said at least one receiver optical waveguide, for receiving said optical signals from free space.

14. The wireless free space communications system of claim 13, wherein said transmitter optical waveguide and said transmitter imaging optics are spatially separated from said at least one receiver optical waveguide and from said at least one receiver imaging optics.

15. The wireless free space communications system of claim 14, wherein said transmitter imaging optics are aimed at said receiver imaging optics, so that said transmitted optical signals are at least partly intercepted by said receiver imaging optics.

16. The wireless free space communications system of claim 13, wherein said transmitter imaging optics are aimed at said receiver imaging optics, so that said transmitted optical signals are at least partly intercepted by said receiver imaging optics.

17. A wireless communications system, comprising:

(a) a transmitter optical waveguide having a proximal end and a distal end;

(b) transmitter imaging optics, optically coupled to said distal end of said transmitter optical waveguide;

(c) a plurality of receiver optical waveguide, each said receiver optical waveguide having a proximal end and a distal end;

(d) for each said receiver optical waveguide, respective receiver imaging optics optically coupled to said distal end of said each receiver optical waveguide; and (e) an optical communication network interface unit, optically coupled to said proximal ends of said transmitter optical waveguide and of said receiver optical waveguides, for transmitting optical signals to said transmitter optical waveguide and for receiving optical signals from said receiver optical waveguides.

* * * * *